Patented Jan. 14, 1936

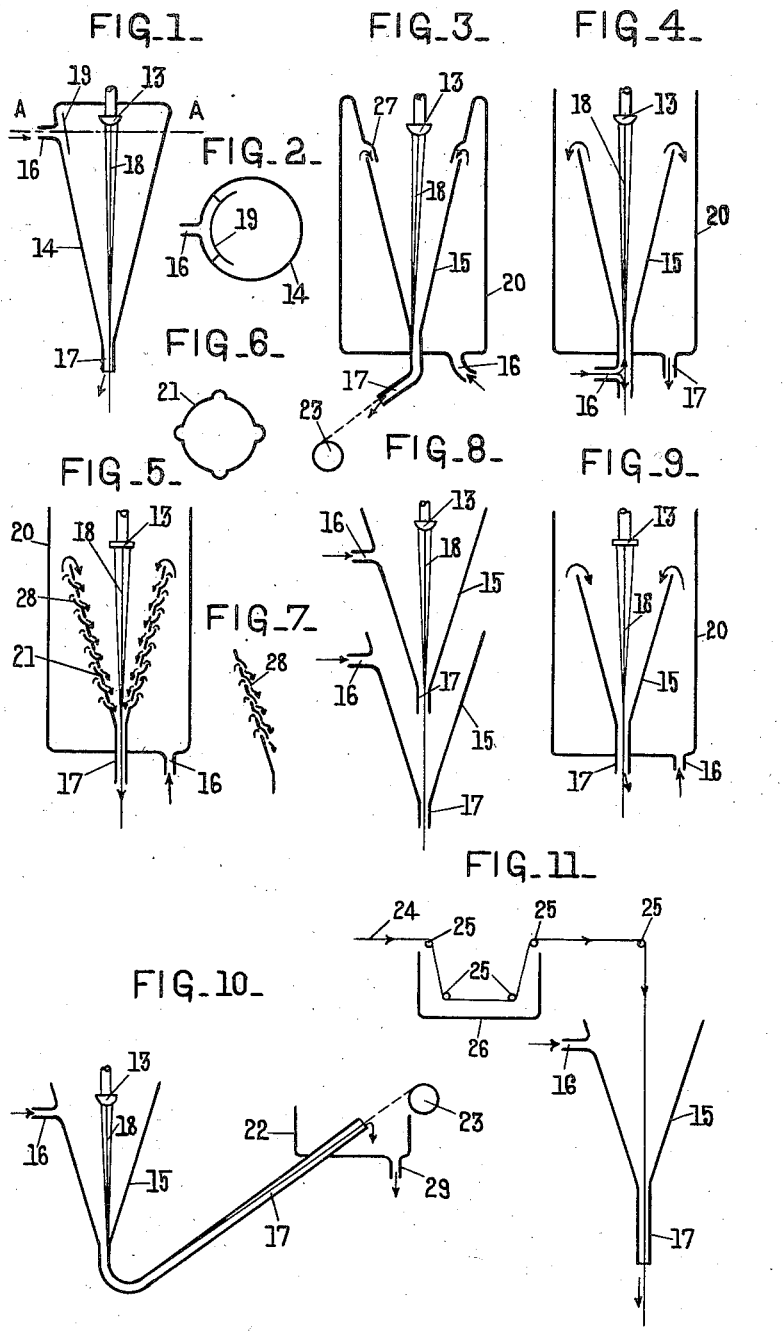

2,027,419

UNITED STATES PATENT OFFICE 2,027,419

PRODUCTION OF ARTIFICIAL THREADS, FILAMENTS, RIBBONS, AND THE LIKE

Henry Dreyfus, London, England

Application January 7, 1932, Serial No. 585,379
In Great Britain January 16, 1931

7 Claims. (Cl. 18—54)

This invention relates to processes for the production and treatment of artificial threads, filaments, ribbons, films and the like containing organic derivatives of cellulose, and is particularly concerned with processes whereby a stretch is imparted to the materials.

Prior U. S. Patents Nos. 1,465,994 and 1,467,493 disclosed processes for spinning cellulose acetate and other organic derivatives of cellulose into coagulating baths containing solvents for the cellulose derivative. These processes result in the coagulation of the solution in the form of a structurally continuous gel. The products of such processes exhibit a strength, elasticity and transparency unobtainable by processes wherein the solutions are spun into liquids, such as water, which cause a rapid and irregular precipitation of the cellulose derivative, resulting in products having a discontinuous, granular, or reticulated internal structure. U. S. applications S. Nos. 402,785 filed October 26, 1929 and 418,414 filed January 3, 1930 disclose the advantage of effecting coagulation of the solutions in the presence of relatively high concentrations of solvents or plasticizing agents for the cellulose derivative. In prior U. S. application S. No. 469,622 filed July 21, 1930 is described a modification of the prior processes wherein salts or other substances capable of decreasing the solubility of the solvent in the non-solvent coagulating medium are employed. In all these processes coagulation is relatively slow on account of the presence of the solvent in the coagulating medium, and the materials may emerge from the coagulating medium in a plastic state.

In working the above processes drawing off may be effected at a greater speed than the velocity of extrusion so as to stretch and reduce the cross-section of the materials. I have now found that when coagulation is effected under such conditions that the materials are obtained in a more or less structurally continuous form, the drawing down effect of the tension applied at the drawing device may with great advantage be supplemented or replaced by imparting to the coagulating medium a velocity in the same direction as that of the thread.

According therefore to the present invention, solutions containing organic derivatives of cellulose are coagulated so as to produce materials having a more or less structurally continuous form, and preferably under such conditions that the materials retain some degree of plasticity over a substantial length of their path, or may even emerge from the coagulating medium in a more or less plastic state, while the coagulating medium is caused to move so as to impart a stretch to the materials.

The invention is applicable to the production of filaments, threads, ribbons and the like from solutions of organic derivatives of cellulose in general. The spinning solutions employed may contain organic esters of cellulose, for example cellulose acetate, formate, propionate and butyrate, and nitroacetate, or ethers of cellulose, for example ethyl, methyl or benzyl cellulose. I prefer to employ solutions of cellulose acetate in organic solvents.

As an example of suitable organic solvents mention may be made of acetone, acetic acid, formic acid, and mixtures of ethylene or methylene dichloride with ethyl or methyl alcohol. The spinning solution may contain relatively high boiling solvents or even plasticizers, for instance di-acetone alcohol, ethyl lactate or diethyl tartrate.

The percentage of cellulose derivative in the spinning solution may vary within wide limits. Obviously the solution should be neither so dilute that excessive shrinkage occurs, nor so concentrated as to render spinning impracticable. In general, concentrations of from 15% to 30%, and preferably of about 25%, are suitable. Where extrusion occurs at temperatures above normal, or where the solubility characteristics of the cellulose derivative are such that solutions of comparatively low viscosity are obtained, higher concentrations than are otherwise permissible may be employed.

Among the coagulating media which may with advantage be employed in carrying out the invention I prefer to employ aqueous media such that coagulation is relatively slow, and the materials may even emerge from the coagulating medium in a plastic state. Thus for example I may employ aqueous coagulants containing thiocyanates, zinc chloride or other inorganic swelling agents for the cellulose derivative as described in prior U. S. Patents Nos. 1,465,994 and 1,467,493; or containing organic swelling agents, for example diacetone alcohol, acetic acid, formic acid, as described in prior U. S. Patent No. 1,467,493; or the relatively strong solutions of solvents or plasticizing agents of U. S. applications S. Nos. 402,785 filed October 26, 1929 and 418,414 filed January 3, 1930; or the coagulants described in U. S. application S. No. 469,622 filed July 21, 1930, in which salts or other substances capable of decreasing the solubility of the solvent in the non-solvent coagulating medium are employed.

For example a 25% solution of cellulose acetate in acetone which contains also 6% of ethyl lactate, may be spun into a coagulating bath consisting of 49 parts by weight of ethyl lactate, 2 parts by weight of sodium chloride and 49 parts by weight of water.

It is to be noted however that, as stated above, water alone is not suitable as a coagulating medium, as precipitation is irregular and rapid, and products are obtained having a discontinuous, granular or reticulated structure to which the process of the present invention cannot advantageously be applied.

I prefer to employ aqueous coagulating media such that the materials remain plastic for some distance along their path and may even emerge from the coagulating medium in a more or less plastic condition. Any other coagulating media capable of coagulating the spinning solution in such a way that a structurally continuous product results, may however be employed. The solution may, for example, be spun into baths containing paraffin oil, petroleum spirit, petroleum ether, toluene or other hydrocarbons, nitro benzene or other nitro-aromatic hydrocarbons, hexachlorethane or other suitable aliphatic or aromatic halogenated hydrocarbons; or animal or vegetable oils, e. g. castor oil, sesame oil or olein may be employed. The coagulating medium must naturally be such that it dissolves at least one constituent present in substantial proportions in the spinning solution, and is a non-solvent for the cellulose derivative. As in the case of aqueous coagulating media, so in non-aqueous media solvents or swelling agents for the cellulose derivative may be present.

It is of very considerable advantage to employ coagulating media of relatively high viscosity. Baths containing a large proportion of mineral acids, e. g. sulphuric acid, mineral acid esters, e. g. ethyl sulphuric acid, or other products resulting from the sulphonation or sulphation of organic compounds, e. g. benzene sulphonic acid, Turkey red oil, Twitchell's reagent and sulphonated brown coal oil are valuable in this respect. The viscosity of the coagulant may be increased by the addition of suitable substances thereto. A large variety of substances is available for this purpose. In the case of aqueous coagulants I have found that valuable results may be obtained by the addition of carbohydrates and other polyhydroxy compounds, e. g. starch, sulphite cellulose waste lye and other poly-saccharides, sucrose, molasses, glucose, lactose, mannit, dulcit, and glycerol. Thus a spinning solution consisting of 25% of cellulose acetate dissolved in acetone may be spun into an aqueous coagulating bath consisting of 30% by weight of diacetone alcohol, 30% by weight of glucose and 40% by weight of water. The particular substances selected must, of course, be compatible with the other constituents of the coagulating medium.

The spinning process may be carried out at the ordinary temperature of the atmosphere or at temperatures substantially lower than or in excess of atmospheric temperature. By spinning at temperatures above atmospheric temperature, for example temperatures above 20°, 50° or even higher according to the nature of the spinning solution and the coagulant employed, drawing down of the materials is facilitated and products of low denier may readily be obtained, as described in U. S. application S. No. 316,617 filed November 1, 1928. By maintaining the temperature of the coagulant above that of a constituent of the spinning solution, hollow filaments may be obtained, see British Patent No. 341,383. If desired, a temperature difference may be maintained along the path of the materials in the spinning bath and/or in any subsequent treatment baths.

In carrying the invention into effect I prefer to spin downwards into a descending column of coagulating liquid. The liquid column may be contained between the walls of a cylindrical, conical or other suitably shaped vessel supported vertically or at an angle to the vertical. In the simplest form of apparatus the coagulating liquid may enter at the top of the spinning vessel and flow downward into a bath under a sufficient head to exert the required stretch upon the materials. The funnel may or may not be open to the atmosphere. It is of advantage to employ a spinning vessel of such form that the velocity of the descending liquid increases progressively during the whole or at least the latter part of its descent, so that a greater stretch is applied to the filaments or the like in the later stages of coagulation, when they are able to withstand a greater tension than in the initial stages. A simple way of achieving this effect is to employ a vessel, at least the lower portion of which is in the form of an inverted cone. Where for example the vessel is in the form of an inverted cone surmounted by a cylinder, the velocity of the descending liquid will be substantially uniform while traversing the cylindrical portion of the vessel and will gradually increase within the conical zone, reaching a maximum just before delivery into the bath. The liquid drag may be applied from outside the bundle of filaments (assuming that a multiple jet is employed) or the coagulant may be introduced through the centre of a jet, the orifices of which are arranged in the form of a ring, the drag being in this case applied from the inside of the bundle. Improved results may be obtained by employing a suitable double-walled spinning vessel built up of two concentric vessels, the inner being tapered so as to impart to the liquid flowing therein a progressively increasing velocity, the outer being in the form of a cylinder extending in an upward direction beyond the top of the cone, the arrangement being such that coagulant enters near the base of the outer vessel, rises in the annular space and descends through the inner vessel, the materials being extruded from a jet situated above the mouth of the inner vessel through which they are carried by the descending column of coagulant. In such apparatus it is of advantage to ensure that the liquid rises up the annular space slowly. This may be effected, for example, by making the annular space substantially larger than the volume of the inner vessel and providing said annular space with baffles, beads or the like. The coagulating liquid may on the other hand be introduced into the inner vessel or cone itself (preferably at a point near the lower extremity) so as to cause the incoming liquid stream to divide at the inlet, a part flowing up the cone and down the annular space, while the rest flows down the cone; or the outer vessel may be dispensed with, an outlet for the coagulant being provided near the top of the funnel. In apparatus of this type the filaments and the like undergo a relatively small stretch during the initial stages of coagulation which occur in the upper part of the vessel. By the time the materials reach the inlet of the coagulating liquid however, they are sufficiently strong to support the relatively great tension applied below this point. The maximum tension may be applied over a relatively short part of the path of the filament, or may be continued for some distance along this path, for example by prolonging the funnel at its narrowest diameter in the form of a tube.

The thread may be stretched not only by the flow of coagulant through the funnel itself but also by the rapid flow of liquid in an outer vessel surrounding the lower end of the funnel, said outer vessel being so constructed that an increase of velocity of the liquid flowing therein occurs at or near the point of emergence of the filament from the funnel.

The form of the outer vessel may be such that the increase of velocity occurs sharply in the neighborhood of the lower orifice of the funnel, or on the other hand may gradually increase to a maximum at or near this point. The localization and/or the extent of the tension applied may be varied by suitable means, for example by varying the head of the liquid supplied to the outer vessel relative to that of the liquid in the funnel.

The apparatus may be such that at least a part of the coagulant is used over and over again, being collected in a suitable receptacle after issuing from the spinning vessel, and returned thereto together with fresh coagulant. The spinning vessel may or may not be open to the atmosphere. The flow and/or circulation of the coagulant may be wholly or in part induced by means of injectors or may be brought about by any other suitable means, e. g. by the direct action of pumps or by the application of the siphoning principle. The spinning vessel may be supplied with coagulant from a reservoir situated entirely above said vessel.

Each spinning vessel may be provided with one, two or more jets. These may be multiple or, in case it is required to spin materials of very heavy denier, e. g. bristles, ribbons and the like, single jets. Where the spinning funnel is provided with two or more jets it is of advantage to isolate the materials issuing from the respective jets. Thus for example, in the case of a funnel provided with three multiple jets, the three bundles of filaments obtained may be conducted through three inner cones each supplied with coagulant from a common outer vessel. On the other hand a single inner cone may serve for the three bundles which may or may not be separated at least in the upper part of the cone by partitions.

The form of the jets employed will naturally depend upon the form of the materials to be spun. When a thread composed of several or a large number of filaments is to be produced, the jet may for example take the form of a plate pierced with a number of orifices equal to the number of filaments required and evenly distributed over a circular area. The orifices may be arranged in the form of a ring, the coagulating liquid being introduced into the hollow cone formed by the resulting bundle of filaments. On the other hand, particularly when materials of heavy denier are to be produced each jet may consist of a single orifice. The orifices may be of the type claimed in U. S. application S. No. 304,808 filed September 8, 1928, or may be of circular or other desired cross-section. When for example ribbons are required jets of rectangular cross-section may be employed.

The continuous drawing of the filaments from the spinning funnel may be effected in any convenient manner. Thus for example the filaments or threads may issue in a downward direction from the spinning funnel into the air, the stream of coagulating liquid being diverted to one side, or into a vessel designed to receive the coagulating liquid. On the other hand, where the funnel is prolonged in the form of a tube, this may be so bent as to permit of the material being drawn off in an upward direction.

Although it is preferred to spin according to one or other of the methods described above wherein the spinning solution is extruded into a descending column of coagulant, other methods of spinning so that a stretch is imparted to the materials by the movement of the coagulant may be employed. Thus I may spin into coagulating baths through which coagulant is caused, for example by means of weirs, to flow in such a direction and at such a velocity as to impart a stretch to the materials, and this direction may be substantially horizontal. The coagulating bath may be in the form of an open channel. Or I may spin upwards into a rising column of coagulant.

The spinning solution may also contain non-solvents compatible with the solvent mixture, for example paraffin oil, petroleum ether or other hydrocarbons, castor oil or other animal or vegetable oils. Other substances may be incorporated in the spinning solution in order, for example, to facilitate the spinning process or to improve the properties of the product in some particular respect. Where the spinning solution contains non-solvents for the cellulose derivative these should not, of course, be present in sufficient proportion to precipitate the cellulose derivative.

Finely divided relatively insoluble substances, for example finely divided barium sulphate or titanium oxide, may be incorporated in the spinning solution according for example to the processes of U. S. applications S. Nos. 444,622 filed April 15, 1930, 464,122 filed June 26, 1930, 473,781 filed August 7, 1930, 473,782 filed August 7, 1930, and 488,829 filed October 15, 1930, or formed in the materials by interaction between a soluble salt contained in the spinning solution and a constituent of the coagulating liquid. Thus, for example barium sulphate may be formed within the materials by incorporating barium thiocyanate in the spinning solution and spinning into a bath containing sulphuric acid or a sulphate. In this way products of subdued lustre may be obtained. Processes for obtaining such effects are described in U. S. applications S. Nos. 427,419 filed February 10, 1930, and 303,602 filed September 1, 1928.

Coagulation of the materials may or may not be completed in the spinning vessel or before the materials emerge from the coagulating medium thereof. The materials may pass from the spinning vessel into one or more further treatment baths which may or may not contain coagulating or fixing media. Provided the materials retain or acquire a sufficient plasticity, a further stretch may be imparted by the movement of the liquids in these baths. The materials may in fact be stretched by means of a moving body of liquid in the spinning baths alone, or in further treatment baths or in both. In designing baths in which a further stretch is to be applied by a moving liquid, the same principles may be applied as have been illustrated above in connection with spinning baths. The spinning apparatus may for instance comprise a number of funnels, the spinning solution being extruded through jets into the first wherein some degree of coagulation occurs, the materials from the first funnel being led continuously into the next funnel wherein they are further coagulated and stretched and so on. When such a system is adopted the plasticity of the materials at a given point on the path should be taken into account in fixing the tension applied at that point. Thus where the plasticity of the materials diminishes continually during passage through successive baths, it is of advantage to arrange that the tension in each bath is greater than that in the preceding bath. This may be effected in various ways, for example by employing in the successive baths liquids of increasing viscosity, and/or by causing the velocity of flow of the liquid to increase from the first to the last bath. Alternatively or in addition to increasing the tension applied, the materials may be subjected to conditions tending to maintain or even increase their plasticity. Thus the further treatment baths may be maintained at a higher temperature than the initial coagulating baths.

Provided means are employed for rendering the materials sufficiently plastic, e. g. by introducing a preliminary softening step the stretching process of the invention may be applied not only in the course of a wet spinning process as described above, but continuously with the production of the materials by any wet or even dry spinning process. Further, the combined operations of softening and subsequently stretching cellulose derivative materials by means of a moving body of liquid may constitute a separate process independent of the production of the materials. Such a process provides a means of improving the tensile properties and/or decreasing the denier of filaments, threads, ribbons and the like subsequent to their production. In carrying this process into effect the materials may be drawn from a bobbin or other package through a bath containing a softening liquid, and from there carried into a funnel or other suitably shaped bath, or into the first of a series of such baths, in which a stretch is imparted by the rapid flow of a body of liquid in substantially the same direction as the material. The length of path through the softening liquid, the nature of said liquid, and the temperature, will naturally be such that a sufficient degree of plasticity is induced in the materials to permit of the stretching operation being effected. When the material passes through the air between the softening and the stretching baths the boiling point of the softening liquid should not be so low that all or substantially all the liquid evaporates from the material before the stretching bath is reached.

The air path between softening and stretching baths may be very short or may be eliminated altogether, but even in this case it is of advantage to employ softening agents of moderately high boiling point in order to minimize losses due to evaporation.

Any suitable softening agent may be employed. Among the large variety available may be mentioned acetone, methyl ethyl ketone, cyclo hexanone and other ketones, butyl acetate, ethyl lactate, dibutyl tartrate and other fatty acid esters, diacetone alcohol, ethylene glycol monomethyl ether, phenol, p-toluene sulphonamide and other sulphonamides, urea, thiourea and other ureoid bases, thiocyanates, zinc chloride and other inorganic swelling agents. Mixtures of such solvents may be employed, for instance mixtures of acetone and diacetone alcohol. The liquids are preferably diluted with a non-solvent liquid or diluent, for instance water, benzene or the like. The concentration of the softening liquid will depend to some extent on the solvent power of the reagent used, and by way of example I may mention that diacetone alcohol, diethyl tartrate and ethyl lactate may be employed in aqueous or alcoholic solution in a concentration of about 25%, and in fact very good results are obtained with concentrations of 25 to 65% strength.

Preferably the softening agents employed are such that by reason of their innocuous properties they need not be washed out of the materials and can remain therein to be removed by evaporation only. The best results have been obtained with relatively non-volatile neutral organic solvents diluted with a non-solvent diluent, for example aqueous solutions of diacetone alcohol, diethyl tartrate, mono or diacetin or ethyl lactate.

The time of treatment will depend upon the reagent employed, upon its concentration and upon the temperature, and in general the time and/or concentration may be decreased with increasing temperature. A relatively high concentration of solvent may be obtained on the filaments or other materials by applying a more dilute solution of the solvent in a volatile diluent, and producing the high concentration by evaporation of the diluent. Thus, for example, aqueous solutions of the relatively non-volatile organic reagents referred to above may be allowed to dry in or evaporate on the materials. This drying or evaporation appears to render the materials treated noticeably denser. The concentration of the reagents or the conditions under which they are applied may be varied with the type of material being treated and with its cross-section.

The moving liquid in the stretching baths may be such as to harden the materials. Thus liquids which are non-solvents for the cellulose derivative but solvents for the softening liquid may be employed. On the other hand liquids having a softening effect may be employed. The materials may then undergo a hardening treatment on emergence from the stretching baths. This may for example consist in removing any softening liquid remaining in the materials by means of heat or through the action of a suitable treating liquid. Whatever the nature of the liquid employed in the stretching baths it should preferably have a high viscosity.

The materials may be subjected continuously with the stretching process of the invention to any desired after treatment. The materials may for example be so treated as to modify their lustre; or to produce metallic or other effects; they may be coloured in fast shades, or a fugitive colouration may be imparted for purposes of identification; they may be weighted, mordanted, saponified or otherwise treated so as to modify their dyeing properties; they may be subjected to sizing or other processes designed to facilitate subsequent textile treatments.

The materials may be collected and/or twisted by any suitable means. They may, for example, be collected in a spinning box, or wound on a bobbin, swift or other package.

A further stretch apart from that due to the moving liquid may be applied to the materials at any stage in their path. Such additional stretch may be applied for example by introducing changes of direction and/or of velocity in the path of the materials by means of suitably placed thread guides, and/or by drawing off at a greater speed than that at which the filaments would travel under the tension imparted by the liquid alone. Said additional stretch may be localized or may be distributed over the whole of the path of the materials. The additional stretch may be applied in a single stage or in two or more stages according to the process of British application No. 38,434/30 filed December 20, 1930. Where the materials pass over guide rollers these may be directly driven so that the tension is substantially uniform irrespective of the elongation of the materials. Processes in which cellulose derivative materials are stretched continuously with or subsequent to production are described in detail in British Patent No. 277,089, British application No. 38,434/30, and U. S. applications S. Nos. 378,684 filed July 16, 1929, and 403,140 filed October 28, 1929.

Various types of apparatus which may be employed according to the present invention are shown in the accompanying drawing, but it is to be clearly understood that they are given only by way of illustration, and that the invention is by no means limited thereto.

Figure 1 shows an apparatus in the form of an inverted cone 14. The spinning solution is extruded into the combined stretching and coagulating bath through the spinning jet 13, and the bundle of filaments 18 is coagulated and stretched in the cone by the coagulating liquid, which is introduced through the inlet 16 and which passes out at the bottom of the cone through the outlet 17. On account of the continuously decreasing cross-section of the cone the velocity of the coagulating liquid and thus the stretching force exerted by it upon the filament bundle increases with the distance from the spinning nozzle, so that as the filaments become more completely coagulated so does the stretching force upon them increase. It is convenient to insert a baffle plate 19 opposite the inlet for the coagulating medium, Figure 2, a section on the line A—A of Figure 1 illustrating this detail. By this means the incoming stream of liquid may be diverted, and a smoother flow through the apparatus results. Alternatively the coagulating liquid may be introduced in a direction substantially normal to a radius, or at a smaller angle, and a modified form of baffle employed if desired.

Figure 3 shows a form of apparatus which comprises an inverted cone 15 contained within a cylinder 20. The coagulating medium is introduced at the bottom of the cylinder through the inlet 16, rises in the cylinder, and flows over the upper edge of the cone, down through the interior of the cone, carrying with it the bundle of filaments 18 extruded through the spinning jet 13, and is discharged through the outlet 17. The filaments may be wound on a bobbin 23 or on any other convenient form of apparatus. A truncated cone 21 may be inserted within the top of the cone 15 in order to impart a smoother and more regular flow to the liquid. As shown in Figure 3, such truncated cone may be formed integral with the cylindrical casing 20, but it may of course be formed as a separate portion of the apparatus.

Figure 4 shows a somewhat similar type of apparatus, comprising a cylindrical vessel 20 within which is positioned an inverted cone 15, but in this case the coagulating medium is introduced through the inlet 16 at the lower end of the cone and part is discharged downwards while the remainder flows upwards through the cone and over the edges and is discharged through the orifice 17. In this type of apparatus therefore very little stretch is imparted to the filaments 18 until they have passed through the cone, the main force being applied below the inlet 16.

Another type of apparatus shown in Figure 5 comprises a cone 21 positioned within a cylindrical vessel 20, but in this case openings are made in the sides of the cone, as shown in Figure 5 and in Figure 6, which illustrates a cross-section of the cone, so that some of the coagulating liquid introduced at 16 enters the cone through these openings, and only a portion rises in the cylinder and flows over the top of the cone. As in the other illustrations 13 represents a spinning nozzle which forms the filament bundle 18 which passes out of the cone through the exit 17. A portion of another form of cone for use in this type of apparatus is shown in Figure 7. According to this form the portions 28 project inwards towards the interior of the cone instead of outwards as is shown in Figure 5. Any number of openings may of course be used, either four in a single horizontal plane as shown in Figure 6 or a greater or less number, and they should preferably be staggered vertically so that the openings in one plane do not occupy positions immediately below those in the row above.

Figure 8 shows a form of apparatus in which a series of inverted cones 15 is used. By this means it is possible to use in the first cone a liquid having a small viscosity and to increase the viscosity of the liquids employed in the second and subsequent cones, if more than two are used, so that the stretch imparted to the filaments is progressively increased. Alternatively, the verticle distance between the inlet and outlet in the second and subsequent cones, may be increased so that a higher liquid velocity is obtained, in consequence of the greater head of liquid. In this manner the traction inserted on the filament is also increased. If desired, the same result may of course be achieved by a combination of both methods. As in the other illustrations 13 denotes the spinning jet from which the filament bundle 18 is extruded, and the inlet and outlet orifices are denoted by the numbers 16 and 17 respectively.

Figure 9 shows a simplified form of the apparatus illustrated in Figure 3, and comprises an inverted cone 15 positioned within a cylindrical vessel 20. The coagulating medium is introduced at the bottom of this vessel through the opening 16, and passes over the upper edge of the cone 15 and through the outlet 17, together with the filament bundle 18 which is extruded through the spinning jet 13.

Figure 10 shows a form of apparatus in which the outlet 17 from the cone 15 is bent upwards, so that the filament bundle 18 extruded from the spinning jet 13 may be carried in a straight line from the outlet orifice to the spool or other receiving device 23, while the coagulating medium which is introduced through the opening 16 overflows into the vessel 22 and out through the pipe 29.

Finally, Figure 11 shows a convenient form of apparatus which may be employed when the process of the present application is applied to formed filaments. In this case the filaments 24, which may be drawn either continuously from a dry spinning apparatus or from spools or from other sources of supply, are first carried around thread guides 25 through a softening bath contained in the vessel 26, and then into a conical stretching bath 15 through which the stretching medium flows from the inlet 16 down the cone and out through the outlet 17. This apparatus may, also, if desired, be employed in a wet spinning process, in which the spinning jets are positioned in the bath 26, which contains a liquid imparting a preliminary coagulation to the filaments, which are then passed in a plastic state over thread guides into a cone 15, where a combined coagulation and stretching process is carried out.

The features of two or more of the above types of apparatus may of course be combined if desired and suitable. For example, the baffle plate described in connection with the apparatus shown in Figure 1 may also be applied to the apparatus illustrated in Figures 8, 10 and 11, and the perforated cone shown in Figure 5 may also be employed in apparatus of the types illustrated in Figures 3 and 9.

While the above apparatus has been described with particular reference to its use in the production of filaments and threads, it may also be employed in the manufacture of other products such as films and ribbons, and modifications may be introduced to suit the particular purpose to which it is applied. The term "swelling agent" used in the following claims is not intended to exclude agents which, in high concentration, are solvents for the organic derivatives of cellulose. Care should be taken, however, not to employ such agents in concentrations high enough to damage the materials treated.

What I claim and desire to secure by Letters Patent is:—

1. In a process for the manufacture of artificial filaments, yarns, ribbons and films of organic derivatives of cellulose, the step of stretching such materials which have a continuous structure and which are in a plastic condition by means of a moving body of liquid containing a solvent or swelling agent for the organic derivative of cellulose.

2. Process for the manufacture of artificial filaments, yarns, ribbons and films of organic derivatives of cellulose, comprising stretching such materials which have a continuous structure and which are in a plastic condition by means of a moving body of liquid continuously with their production, said liquid containing a solvent or swelling agent for the organic derivative of cellulose.

3. Process for the manufacture of artificial filaments, yarns, ribbons and films, comprising extruding a solution of an organic derivative of cellulose through a shaping device into a coagulating bath containing a swelling agent for the cellulose derivative to form materials having a continuous structure and in a plastic condition, at least a part of the coagulating bath being caused to move in the direction of travel of the materials so that the materials are stretched.

4. Process for the manufacture of artificial filaments, yarns, ribbons and films, comprising extruding a solution of cellulose acetate through a shaping device into an aqueous coagulating bath containing a swelling agent for the cellulose acetate to form materials having a continuous structure and in a plastic condition, at least a part of the coagulating bath being caused to move in the direction of travel of the materials so that the materials are stretched.

5. Process for the manufacture of artificial filaments, yarns, ribbons and films, comprising extruding a solution of an organic derivative of cellulose containing a high boiling solvent for the organic derivative of cellulose through a shaping device into an aqueous coagulating bath to form materials having a continuous structure and in a plastic condition, at least a part of the coagulating bath being caused to move in the direction of travel of the materials so as to stretch the materials, said coagulating bath containing a solvent or swelling agent for the organic derivative of cellulose.

6. Process for the manufacture of artificial filaments, yarns, ribbons and films, comprising extruding a solution of an organic derivative of cellulose through a shaping device into an aqueous coagulating bath, which has a relatively high viscosity, to form materials having a continuous structure and in a plastic condition, at least a part of the coagulating bath being caused to move in the direction of travel of the materials so as to stretch the materials, said coagulating bath containing a solvent or swelling agent for the organic derivative of cellulose.

7. Process for the manufacture of artificial filaments, yarns, ribbons and films, comprising extruding a solution of an organic derivative of cellulose through a shaping device into an aqueous coagulating bath, which contains a swelling agent for the cellulose derivative and is maintained at a relatively elevated temperature, to form materials having a continuous structure and in a plastic condition, at least a part of the coagulating bath being caused to move in the direction of travel of the materials so as to stretch the materials.

HENRY DREYFUS.